July 23, 1940.  A. J. KIEHNE  2,208,811

PROCESS FOR MAKING THREADING DIES

Filed May 1, 1939

INVENTOR
Alfred J. Kiehne
BY J. L. Stackpole
ATTORNEY

Patented July 23, 1940

2,208,811

UNITED STATES PATENT OFFICE 2,208,811

PROCESS FOR MAKING THREADING DIES

Alfred J. Kiehne, Derby Line, Vt., assignor to Union Twist Drill Company, Athol, Mass., a corporation of Massachusetts Application May 1, 1939, Serial No. 271,014

8 Claims. (Cl. 76—101)

This invention relates to the process of making pronged threading dies.

An object of this invention is to provide an improved die which is more accurate in its thread cutting faces, is more sturdy and stronger than the pronged threading dies now in use and has trailing faces which cut off and remove any burr or chip of metal on the cut thread when the die is unscrewed. Another object to provide a method which is cheaper and more simple for making such a die.

This application is a continuation in part of my application, Ser. No. 178,728, filed December 8, 1937, for "Thread cutting dies."

Other objects and advantages of the present invention will appear in the following detailed description taken in connection with the accompanying drawing in which—

Figure 1:
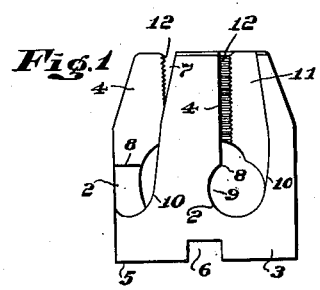
Fig. 1 is a view, in side elevation, of a die embodying this invention.
Figure 2:
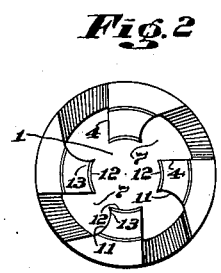
Fig. 2 is a view, in top plan, of the die shown in Fig. 1.

In making a die in accordance with my invention the first step is to form a blank with a cylindrical portion or shank 3 at one end, and a tapered portion at the other end. The base 5 is adapted to abut the face of the spindle on which the die is to be mounted and has the slot 6 adapted to engage a projection on the face of the spindle. Then an axial bore 1 is made entirely through the body of the die, Figs. 2 and 3, or a bore 1' is made only part way through, Figs. 5 and 6. Where the axial bore goes entirely through the die, the next step is to cut the threads 12 on the inside of the bore at and near its tapered portion. (The procedure when the bore is only partial is described later.) Holes 2 are drilled through the shank 3 of the die into the axial bore. There are as many holes 2 as there are prongs. The axes of the holes 2 are substantially parallel to the plane of the base 5 and extend to one side of the longitudinal axis of the die. The bottoms of the holes constitute the lands between the prongs.

After the lateral holes 2 have been drilled, slots 7 are milled into the sides of the die to connect with the holes 2. The slots are cut by an end mill 19, Figs. 3 and 5, which simultaneously cuts both a flat leading face 4 and a trailing face 11 having an outer flat portion and a short inner curved portion 14.

Figure 3:
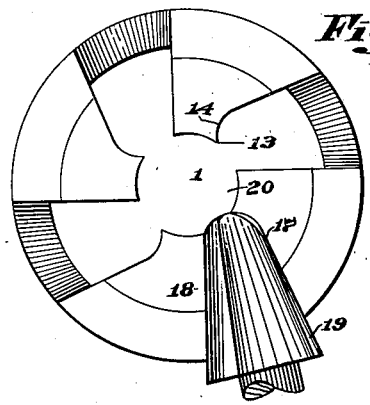
Fig. 3 is an enlarged top plan view illustrating a cutting tool when in engagement with a die.
Figure 5:
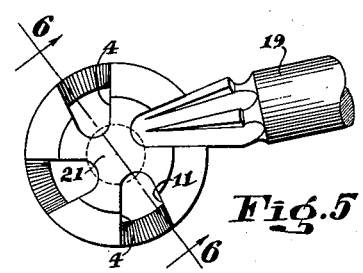
Fig. 5 is a top plan view illustrating the preferred practice of the invention.

Figs. 3 and 5 illustrate the manner in which the leading faces 4 and the trailing faces 11 are cut. The cutting tool 19, in the form of an end mill having straight tapered sides 18 and a round end 17 is moved bodily, relatively to the die, parallel to the axis of the die with the axis and tip of the tool pointing inwards as shown. The slot cutting operation is continued until the tool 19 reaches the point where the slot being cut terminates in a circular hole 2. With such an end mill there is no danger of cutting into the metal at the bottom of a bore 2 as there would be if an ordinary milling tool were used. Each slot 7 is offset to its associated hole 2 so that the flat leading face 4 terminates in an edge 8 where it joins the hole above the axis of the hole, thus forming an undercut 9 below the leading face so that the leading face may be ground by a suitable tool entering a slot 7 and a hole 2 without engaging the land below the face being sharpened.

To provide adequate strength the trailing face of the prong, near the base of the prong, is cut to a shape, indicated at 10, which leads into the curvature of the associated hole 2 to provide maximum width of the prong near its base.

The inner ends of the trailing faces 11 are cut by the end of the milling cutter in the form of curved surfaces 14 which meet the thread cutting teeth 12 at an acute angle 13 which forms sharp acutely pointed ends on the teeth 12.

When the die is unscrewed from a cut thread, any chip or burr on the thread will be cut off by the edge 13 and thrown clear of the thread and die by the curved surface 14 of the trailing face.

Figure 4:
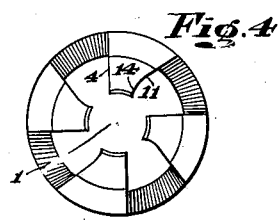
Fig. 4 is a top plan view similar to Fig. 2, showing a slight modification of the invention.

While the angle of the edge 13 may be varied considerably, a 60° angle is satisfactory. The preferred angle is such that a plane at the apex of the angle and tangent to the curve 14 of the trailing face 11 will be parallel to the cutting face of the prong as shown in Fig. 4. Or the angle may be made more acute as in Fig. 2.

To mill simultaneously the flat leading face 4 and the trailing face 11 with the curve 14 and the angle 13 at its inner end, the axis of the end milling tool points to one side of the longitudinal axis of the bore 1, as shown, and the tool is so shaped that its straight sides cut the flat leading face, and the curved end cuts the trailing face so as to form the acute angle 13. The acuteness of this angle may be obtained by having the end of the tool, in the line of its axis, approach closely to the acute end of the angle 13, i. e., where the bore 1 intersects the curved end of the trailing face.

Figure 6:
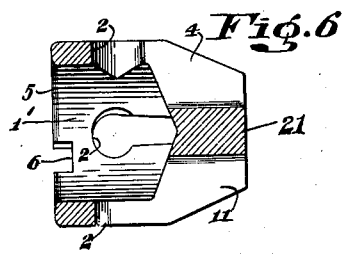
Fig. 6 is a sectional view taken on line 6—6 of Fig. 5.

As above stated, I may first drill the die from the base end only partially through the length thereof as illustrated in Figs. 5 and 6, thereby leaving a tie-piece or core connection 21 between the parts which are to form the ends of the several prongs. The holes 2 are then bored. During the next operation of milling the slots 9, the connection 21, prevents the pressure of the milling tool from springing adjacent prongs, as may occur in cutting the slots 7 if the bore has been made entirely through the die so that the prongs are not supported circumferentially after the first slot 7 has been cut. Thus there is eliminated the necessity for expensive holding fixtures for holding the prongs under compression as in the case where the die has been previously bored axially throughout its entire length. Moreover, the presence of the connection 21 makes it possible to mill the prongs to a more uniform cross-section because no springing action of the prongs is permitted.

Following the milling of the slots, the connection 21 is drilled out as indicated by the dotted circle in Fig. 5, thus removing the metal and completing the operation of forming the prongs. The threads are then formed.

The die is hardened in the usual manner.

While the invention has been described in detail by way of illustration, it is not intended so to limit the invention; for example, the feature of employing the connection 21 to support the ends of the prongs during the milling operations is equally useful if the milling operation be conducted in accordance with the ordinary present day practice as distinguished from the use of the end mill as set forth herein. Other variations in the details of construction may be made, as will be apparent to one skilled in the art, without departing from the scope of the invention defined in the following claims.

Having described my invention, I claim:

1. The process of making a pronged thread cutting die, which consists in forming a blank with a cylindrical portion and a tapered portion, boring the blank axially, cutting a thread on the inside of the bore at and near its tapered portion, boring lateral holes from the outside of said cylindrical portion into the axial bore, the bottoms of which holes are to constitute the lands between the prongs, milling out the material between adjacent prongs and above a lateral hole by a bodily movement of a rotating end milling cutter in a plane parallel to the axis of the blank thus forming a leading side on a prong which is substantially a flat vertical plane which meets the sides of the lateral hole above its axis and a trailing side on the adjacent prong which has an outer flat portion and a short inner curved portion meeting the threaded portion of the prong at an acute angle, whereby the die is characterized by thread cutting prongs each having a flat vertical leading side which is undercut by a lateral hole and a trailing side which has an inner curved portion providing the cutting threads with acutely pointed ends.

2. The process of making a pronged thread cutting die, which consists in forming a blank with a cylindrical portion and a tapered portion, boring the blank axially, cutting a thread on the inside of the bore at and near its tapered portion, boring lateral holes from the outside of said cylindrical portion into the axial bore, the bottoms of which holes are to constitute the lands between the prongs, milling out the material between adjacent prongs and above a lateral hole by a bodily movement of a rotating end milling cutter in a plane parallel to the axis of the blank, the axis of the milling cutter passing to one side of the axis of the axial bore, thus forming a leading side on a prong which is substantially a flat vertical plane and a trailing side on the adjacent prong which has an outer flat portion and a short inner curved portion meeting the threaded portion of the prong at an acute angle, whereby the die is characterized by thread cutting prongs each having a flat vertical leading side and a trailing side which has an inner curved portion providing the cutting threads with acutely pointed ends.

3. The process of making a pronged threading die which consists in forming a blank with a cylindrical portion and a tapered portion, boring axially the cylindrical portion of said blank but leaving a core at the tapered portion thereof, milling the blank longitudinally to form external grooves therein with the metal between the grooves connected by said core, thereafter boring axially the tapered portion of said blank to form separate prongs, and cutting a thread on the inside of said prongs.

4. The process of making a pronged threading die which consists in forming a blank with a cylindrical portion and a tapered portion, boring axially the cylindrical portion of said blank but leaving a core at the tapered portion thereof, boring lateral holes from the outside of said cylindrical portion into the axial bore, the bottom of which holes are to constitute the lands between the prongs, milling the blank longitudinally to form external grooves therein with the metal between the grooves connected by said core, thereafter boring axially the tapered portion of said blank to form separate prongs, and cutting a thread on the inside of said prongs.

5. The process of making a pronged threading die which consists in forming a blank with a cylindrical portion and a tapered portion, boring axially the cylindrical portion of said blank but leaving a core at the tapered portion thereof, end milling the blank longitudinally to form external grooves therein with the metal between the grooves connected by said core to provide on one side of each groove a substantially vertical plane and on the other side a surface composed of an outer vertical plane portion and a short inner curved portion, thereafter boring axially the tapered portion of said blank to form separate prongs, and cutting a thread on the inside of said prongs.

6. In the process of making a pronged thread cutting die having a tapered end portion, the steps which consist of end and side milling a blank longitudinally to form spaces between adjacent prongs, each space having opposite flat faces in planes converging inward toward one another and meeting in a line so related to the longitudinal axis of the die that a bisecting plane passes to one side of said longitudinal axis of the die, forming by said milling a curved inner portion on one of said faces, boring the center of said die blank longitudinally, either before or after said milling, to such a size that the curved circumference of said bore intersects said curved inner portion of said face thus forming an acute angle at the junction therewith, said curved circumference forming with the opposite flat face a cutting edge at the inner end thereof, and, following said boring, cutting threads in the bore thus formed.

7. In the process of making a pronged thread cutting die from a blank having a cylindrical portion and a tapered end portion, the steps which consist of boring lateral holes from the outside of said cylindrical portion and towards the axis thereof, the bottoms of which holes form lands, end and side milling the blank longitudinally to form spaces between adjacent prongs, each space having opposite flat faces in planes converging inward toward one another and meeting in a line so related to the longitudinal axis of the die that a bisecting plane passes to one side of said longitudinal axis of the die, forming by said milling a curved inner portion on one of said faces, and at some stage of the process, boring the center of said die blank longitudinally to such a size that the curved circumference of said bore intersects said curved inner portion of said face thus forming an acute angle at the junction therewith, said curved circumference forming with the opposite flat face a cutting edge at the inner end thereof, and, following said boring, cutting threads in the bore thus formed.

8. The process of making a pronged thread cutting die from a blank having a cylindrical portion and a tapered end portion, by forming a leading planar cutting face on each prong and of forming a trailing face with an outer planar portion and an acute cutting edge at the inner end of the trailing face of each prong, which includes boring lateral holes from the outside of said cylindrical portion and towards the axis thereof, the bottoms of which holes form lands, milling the blank longitudinally to form a space between adjacent prongs and at the same time planar surfaces on opposite sides of said space, the planes of said surfaces converging inward toward one another and meeting in a line so related to the longitudinal axis of the die that a bisecting plane passes to one side of said longitudinal axis of the die, forming a curved inner portion on one only of said surfaces, and at some stage of the process boring the center of said die blank longitudinally to such a size that the curved circumference of said bore intersects said curved inner portion of said trailing face at an acute angle at the junction therewith, whereby to provide a sharp acute rear cutting edge, the sides of which are divergently curved, said curved circumference forming with the planar surface of said leading face, a cutting edge at the inner end thereof, and, after said boring, cutting threads in the bore thus formed.

ALFRED J. KIEHNE.